(12) United States Patent
Schultink et al.

(10) Patent No.: US 8,152,879 B2
(45) Date of Patent: *Apr. 10, 2012

(54) FILTER BAG FOR A VACUUM CLEANER AND ALSO USE THEREOF

(75) Inventors: Jan Schultink, Overpelt (BE); Ralf Sauer, Overpelt (BE)

(73) Assignee: Eurofilters N.V., Overpelt (BE)

( * ) Notice: Subject to any disclaimer, the term of this patent is extended or adjusted under 35 U.S.C. 154(b) by 572 days.

This patent is subject to a terminal disclaimer.

(21) Appl. No.: 12/295,998

(22) PCT Filed: Apr. 10, 2007

(86) PCT No.: PCT/EP2007/003180
§ 371 (c)(1),
(2), (4) Date: Dec. 22, 2008

(87) PCT Pub. No.: WO2007/118640
PCT Pub. Date: Oct. 25, 2007

(65) Prior Publication Data
US 2009/0266233 A1 Oct. 29, 2009

(30) Foreign Application Priority Data
Apr. 13, 2006 (DE) .......................... 10 2006 017 553

(51) Int. Cl.
*B01D 46/02* (2006.01)
(52) U.S. Cl. ............ 55/382; 55/485; 55/486; 55/DIG. 2
(58) Field of Classification Search .................... 55/382, 55/381, 361, 486, 522, 524, 527, DIG. 2, 55/DIG. 39; 428/36.1; 15/347, DIG. 8; 95/273, 95/287; 156/64, 73.1, 73.5
See application file for complete search history.

(56) References Cited

U.S. PATENT DOCUMENTS

| 5,647,881 A * | 7/1997 | Zhang et al. ............... 55/382 |
|---|---|---|
| 5,900,305 A | 5/1999 | Chapman |
| 6,156,086 A * | 12/2000 | Zhang .............................. 55/382 |
| 6,193,773 B1 * | 2/2001 | Schlor et al. ..................... 55/382 |
| 0,203,694 A1 | 10/2003 | Deka et al. |
| 0,211,160 A1 | 10/2004 | Ramming et al. |
| 6,966,939 B2 * | 11/2005 | Rammig et al. ................ 55/486 |
| 2003/0000389 A1 | 1/2003 | Schultheiss et al. |
| 2007/0175190 A1 * | 8/2007 | Schultink ......................... 55/467 |
| 2009/0056548 A1 * | 3/2009 | Woo et al. ........................ 95/287 |

FOREIGN PATENT DOCUMENTS

| DE | 198 32 611 | 2/2000 |
|---|---|---|
| DE | 601 00 985 | 7/2004 |
| DE | 20 2005 018 003 | 2/2006 |
| DE | 10 2005 059 214 | 6/2007 |
| EP | 0 854 943 | 12/2001 |
| EP | 1 197 252 | 4/2002 |
| EP | 1 236 494 | 9/2002 |
| EP | 1 254 693 | 11/2002 |
| EP | 0 960 645 | 8/2003 |
| EP | 1 258 277 | 11/2003 |
| EP | 1 362 627 | 11/2003 |
| GB | 1 481 666 | 8/1977 |
| WO | 2004/027135 | 4/2004 |

OTHER PUBLICATIONS

Falbe et al., "Rompp," 2 sheets, 1989.
Albrecht et al., "Vliestoffe," WILEY-VCH Verkag GmbH, 2000, 8 sheets.
Starr, "The Nonwoven Fabrics Handbook," INDA, Association of the Nonwoven Fabrics Industry, 1992, 17 sheets.
Albrecht et al., "Vliestoffe," WILEY-VCH Verkag GmbH, 2000, pp. 363-369 and 388-399.

* cited by examiner

*Primary Examiner* — Duane Smith
*Assistant Examiner* — Minh-Chau Pham
(74) *Attorney, Agent, or Firm* — Fay Kaplun & Marcin, LLP

(57) ABSTRACT

A filter bag for a vacuum cleaner made of a composite material including at least three layers, at least two layers which include a nonwoven fabric layer and at least one nonwoven fiber layer being connected by a weld.

28 Claims, No Drawings

FILTER BAG FOR A VACUUM CLEANER AND ALSO USE THEREOF

FIELD OF INVENTION

The present invention relates to a filter bag for a vacuum cleaner made of a composite material comprising at least three layers, at least two layers which comprise a nonwoven fabric layer and at least one nonwoven fibre layer being connected by a weld. The invention relates furthermore to the use of a filter bag of this type.

BACKGROUND INFORMATION

In the last few years, numerous development have become known which deal with replacing the filter materials made from mono- or multilayer papers or fabrics which have been known for a long time in the state of the art. Thus dust filter bags are described in EP 1 258 277 B1 and in EP 0 960 645 B1, in which a composite made of nonwoven materials is used as filter material. The composite thereby comprises at least two layers, these layers having different filtration properties.

Furthermore, a filter medium made of a nonwoven material is described in EP 1 197 252 A1 in which electrostatically charged split fibres are connected by ultrasonic welding to form a compacted web made of nonwoven material. In order also to endow the layer material with corresponding stability, it is thereby provided that at least 5% of the surface is provided with weld points relative to the entire surface of the filter material and that at least two weld points per cm$^2$ are present. It is consequently achieved that the individual fibres are connected directly to each other by ultrasonic welding. It is mentioned as an advantage of a filter medium of this type that the production costs relative to a needling method are significantly less and that consequently uniformity is produced so that an improvement is achieved relative to those filter media which are connected for example by needling.

It is provided furthermore also in the above-mentioned European application that this thus stabilised filter medium can be connected also to further nonwoven layers.

It is disadvantageous with the filter medium of EP 1 197 252 A1 above all that the dust storage capacity for house dust is simply inadequate.

Furthermore, an electrostatic filter medium which comprises 2 to 20 meltblown layers (ultrafine nonwoven fibre layers) is known from U.S. Pat. No. 5,900,305. The meltblown layers are thereby connected to each other by welds. It is unfavourable in the case of the filter medium according to U.S. Pat. No. 5,900,305 that, for use in dust filter bags in which the medium to be filtered out is present in the most varied of particle sizes, it does not have a sufficient dust storage capacity.

SUMMARY OF INVENTION

The present invention relates to a filter bag, the filter material of which, in comparison with those described in the state of the art, has a significantly higher dust storage capacity and at the same time as low a pressure loss as possible occurring.

DETAILED DESCRIPTION

The object is achieved by the features of patent claim 1. The sub-claims reveal advantageous developments.

According to the invention, a filter bag for a vacuum cleaner is proposed, which filter bag comprises a filter material which comprises at least three layers, at least two layers which comprise at least one nonwoven fabric layer and at least one nonwoven fibre layer being connected by a weld. In the case of the filter bag according to the invention, it is required in addition that the layer termed nonwoven fibre layer contains filaments and/or staple fibres, charged split fibres being excluded and the compressed surface area proportion of the weld pattern thereby being at most 5% of the surface of the permeable surface area of the filter bag. It is provided furthermore that, relative to the total permeable surface area, on average at least 20 welds per 10 cm$^2$ are present.

It is essential with the subject of the present invention that the filter material of the filter bag according to the invention contains, in addition to a further layer, a composite which comprises at least two different layers, namely at least one nonwoven fibre layer and at least one nonwoven fabric layer.

There is thereby understood by nonwoven fibre layer in the sense of the invention, a layer which comprises loosely laid fibres or filaments. The methods for laying fibres are known from the state of the art for nonwovens. In the nonwoven fabric production, the main process steps, raw material treatment, web formation, web compaction, nonwoven fabric needling are passed through. The loose, still non-bonded fibrous web produced during nonwoven formation is thereby termed web (see Nonwoven Fabrics W. Albrecht, H. Fuchs, W. Kittelmann, Wiley VCH, 2000). As a result of the web-binding step, the nonwoven fabric is produced from the fibrous web and has sufficient strength in order to be wound into rolls for example. This last-mentioned step is hence not effected during the production of the nonwoven fibre layer according to the invention, instead, the web is bonded to a nonwoven fabric layer.

From the point of view of materials, the nonwoven fibre layer of the invention, which is present in a composite with the nonwoven fabric layer, comprises all the staple fibres and/or filaments which are known per se in the state of the art. There are understood by staple fibres in the sense of the invention also fibrillated film fibres (split fibres) and crimped fibres. It is thereby essential that at least the split fibres are not charged according to the present invention. The inventors were able to show that even if all the fibres of the nonwoven fibre layer are not charged, excellent properties with respect to the dust storage capacity are always still achieved.

As crimped fibres, those have proved particularly favourable according to the present invention, which have a spatial structure, such as e.g. a zig-zag, undulating and/or a spiral structure. The advantage of such fibres resides in the fact that they still significantly increase the bulk of the medium.

The crimped fibre can be a mechanically crimped, an autocrimped fibre and/or a bicomponent crimped fibre. Autocrimped fibres are described for example in the EP patent 0 854 943 and in PCT/GB 00/02998. Bicomponent crimped fibres are obtainable for example via Chisso Corporation in Japan and crimped polyester staple fibres of the spiral type at Gepeco in the United States.

In the invention, staple fibres which are selected from natural fibres and/or chemical fibres can be used. Examples of chemical fibres are in particular polyolefins and polyesters. Examples of natural fibres are cellulose, wood fibres, kapok, flax.

The staple fibres according to the invention thereby have a length between 1 and 100 mm, preferably between 3 and 70 mm. The mass surface density of the nonwoven fibre layer according to the invention is between 10 and 200 g/m$^2$, preferably between 20 to 100 g/m$^2$.

The nonwoven fabric layer of the filter bag according to the invention is preferably a support or carrier layer and has a mass surface density of at least 5 g/m². As the nonwoven fabric layer itself, a scrim is usefully used. There is thereby understood by a scrim any air-permeable material which can serve as carrier or reinforcement layer. It can be a nonwoven fabric, a woven material or netting. Preferably, it comprises a thermoplastic polymer in order to facilitate the weldability to the nonwoven fibre layer. Scrims are examples of spunbonds. However they can also be dry or wet-laid nonwoven materials which have sufficient mechanical stability. The mass surface density of a nonwoven layer of this type is according to the present invention preferably between 10 and 200 g/m², particularly preferred between 20 to 100 g/m². The mass surface density in g/m² is thereby determined according to DIN EN 29073-1.

The filter bag according to the invention comprises at least three layers, at least two layers, which comprise at least one above-described nonwoven fabric layer and at least one above-described nonwoven fibre layer, are connected by a weld. It is thereby essential that the compressed surface area component of the weld pattern is at most 5% of the surface of the permeable surface area of the filter bag and that, relative to the total permeable surface area of the filter bag, on average at least 20 welds per 10 cm² are present. It is thereby particularly preferred if at least 25 welds per 10 cm² are present, particularly preferred at least 50 welds per 10 cm². It is furthermore favourable if the welds are distributed uniformly over the permeable surface area of the filter bag.

Of course, it is also possible that the welds are disposed only in isolated regions of the permeable surface area.

The weld itself can thereby have a star-shaped, punctiform, bar-shaped and/or linear configuration. In the case of the geometry of the welds to be applied, it is then particularly favourable if an arrangement is chosen in which a cushion-like configuration is present. By means of this cushion-like configuration in particular, i.e. by means of a linear application of welds at defined spacings from each other, an above-average high dust storage capacity can be achieved.

As the current method for welds, ultrasonic welding can be chosen according to the present invention in the case of the filter bag as is known per se in the state of the art.

In the case of the filter bag according to the invention, it is thereby favourable in addition if the composite comprises two nonwoven layers between which the nonwoven fibre layer is disposed. The composite can also comprise a nonwoven fabric layer and a fine fibre spunbond layer between which the nonwoven fibre layer is disposed. Of course, it is possible that the composite comprises further fine fibre spunbond layers. It is thereby preferred if the fine fibre spunbond layers have different filter properties, it being favourable for the dust filter bag if a fine fibre spunbond layer is disposed downstream.

As further layers which possibly can be contained in addition in the composite, there should be mentioned paper, nonwoven material and/or nanofibre layers. It is thereby possible that all the layers are connected to each other also continuously by the ultrasonic weld.

The invention claimed is:

1. A filter bag for a vacuum cleaner made of a filter material, comprising:
   at least three layers, at least two layers of the at least three layers comprise at least one nonwoven fabric layer and at least one nonwoven fibre layer being connected by a weld,
   wherein the nonwoven fibre layer includes at least one of filaments and staple fibres, apart from fibrillated film fibres, wherein a compressed surface area proportion of the weld pattern is at most 5% of a surface of a permeable surface area of the filter bag, and wherein, relative to the total permeable surface area of the filter bag, on average, at least 20 welds per 10 cm² are present.

2. The filter bag according to claim 1, wherein on average at least 25 welds per 10 cm² are present.

3. The filter bag according to claim 2, wherein at least 50 welds are present.

4. The filter bag according to claim 1 to, wherein the welds are distributed uniformly over the permeable surface area of the filter bag.

5. The filter bag according to claim 1, wherein the welds are distributed non-uniformly over the permeable surface area of the filter bag.

6. The filter bag according to claim 1, wherein the welds have at least one of the following configurations: a star-shaped, a punctiform, a bar-shaped and a linear configuration.

7. The filter bag according to claim 1, wherein the compressed surface area proportion of the weld pattern is at least 2%.

8. The filter bag according to claim 1, wherein the compressed surface area proportion of the weld pattern is at least 3%.

9. The filter bag according to claim 1, wherein the staple fibres have a length between 1 and 100 mm.

10. The filter bag according to claim 1, wherein the staple fibres have a length between 3 to 70 mm.

11. The filter bag according to claim 1, wherein the staple fibre is at least one of a crimped fibre and a further staple fibre.

12. The filter bag according to claim 11, wherein the crimped fibre has different spatial structures.

13. The filter bag according to claim 11, wherein the crimped fibre has different spatial structures which includes at least one of a zig-zag type, an undulating type and a spiral type.

14. The filter bag according to claim 11, wherein the crimped fibre is at least one of a mechanically crimped, an autocrimped fibre and a bicomponent fibre.

15. The filter bag according to claim 1, wherein the staple fibre is selected from at least one of natural fibres and chemical fibres.

16. The filter bag according to claim 1, wherein a mass surface density of the nonwoven fibre layer is between 10 and 200 g/m².

17. The filter bag according to claim 1, wherein a mass surface density of the nonwoven fibre layer is between 20 to 100 g/m².

18. The filter bag according to claim 1, wherein the nonwoven fabric layer has a mass surface density of at least 5 g/m².

19. The filter bag according to claim 18, wherein the nonwoven fabric layer is a scrim.

20. The filter bag according to claim 18, wherein the nonwoven fabric layer is one of a spunbond layer and a meltblown layer.

21. The filter bag according to claim 1, wherein the composite comprises two nonwoven fabric layers between which the nonwoven fibre layer is disposed.

22. The filter bag according to claim 1, wherein the composite comprises a nonwoven fabric layer and a fine filter spunbond layer between which the nonwoven fibre layer is disposed.

23. The filter bag according to claim 22, wherein the composite comprises at least one further fine fibre spunbond layer.

24. The filter bag according to claim 23, wherein the fine fibre spunbond layers have different filter properties.

25. The filter bag according to claim 13, wherein a fine fibre spunbond layer is disposed downstream.

26. The filter bag according to claim 1, wherein the further layers are formed from at least one of paper, nonwoven material and nanofibres.

27. The filter bag according to claim 1, wherein all the layers are connected continuously by an ultrasonic weld.

28. The filter bag according to claim 1, wherein a cushion-like configuration is present due to an arrangement of the welds.

* * * * *